US007806089B2

(12) United States Patent
Walker-Indyke et al.

(10) Patent No.: US 7,806,089 B2
(45) Date of Patent: Oct. 5, 2010

(54) PET GROOMING RESTRAINT APPARATUS AND METHOD

(75) Inventors: Leslie-Anne Walker-Indyke, Woodstock, IL (US); Mark M. Indyke, Woodstock, IL (US)

(73) Assignee: Royal Pet Services Inc., Woodstock, IL (US)

( * ) Notice: Subject to any disclaimer, the term of this patent is extended or adjusted under 35 U.S.C. 154(b) by 280 days.

(21) Appl. No.: 11/985,538

(22) Filed: Nov. 15, 2007

(65) Prior Publication Data

US 2009/0126650 A1    May 21, 2009

(51) Int. Cl.
*A01K 13/00* (2006.01)
(52) U.S. Cl. ...................................... 119/756; 119/753
(58) Field of Classification Search ................. 119/756, 119/753, 754, 755, 757, 600, 601, 752, 728
See application file for complete search history.

(56) References Cited

U.S. PATENT DOCUMENTS

| 952,479 | A | * | 3/1910 | Sturm | 119/752 |
|---|---|---|---|---|---|
| 3,208,432 | A | * | 9/1965 | Fisk | 119/756 |
| 3,250,252 | A | * | 5/1966 | Leopold | 119/756 |
| 3,524,434 | A | * | 8/1970 | Finley | 119/756 |
| 3,744,457 | A | * | 7/1973 | Heine et al. | 119/756 |
| 4,003,341 | A | * | 1/1977 | La Croix | 119/756 |
| 4,570,577 | A | * | 2/1986 | Bellinger | 119/725 |
| 5,488,926 | A | * | 2/1996 | Hunt | 119/756 |
| 5,943,983 | A | * | 8/1999 | Drew et al. | 119/722 |
| 5,960,746 | A | * | 10/1999 | Salts | 119/756 |
| 6,516,753 | B1 | * | 2/2003 | Taylor | 119/756 |

FOREIGN PATENT DOCUMENTS

DE    3152037 A1 *  7/1983

* cited by examiner

*Primary Examiner*—T. Nguyen
(74) *Attorney, Agent, or Firm*—James E. Potthast; Potthast & Associates

(57) ABSTRACT

Pet grooming restraint apparatus (20, FIG. 1 and 82, FIG. 5) with an elongate, overhead frame member (22) and support assemblies (56, 54 and 82, 84, 86) for supporting the overhead frame member above an underlying table (32) provide lateral support to prevent inadvertent tipping while providing good access to a pet (36) through spaces 49, 57 and 83. Each support assembly (52, 54) in one embodiment (20) has a pair of laterally spaced support members (56, 58) connected to opposite sides (28, 30) of the overhead frame member (22) at each end (24, 26) of the overhead frame member (22) that extend laterally outwardly from each other and downwardly to distal ends (64, 66). The distal ends are attached to opposite ends of a foot member (74), which, in turn, is attached to table (32). In another embodiment (82), lateral support is provided by an L-shaped support member assembly (81) while the opposite ends of the overhead frame member (22) are supported by vertical support members (84, 86) directly underlying opposite ends (24, 26) of the overhead frame member.

15 Claims, 8 Drawing Sheets

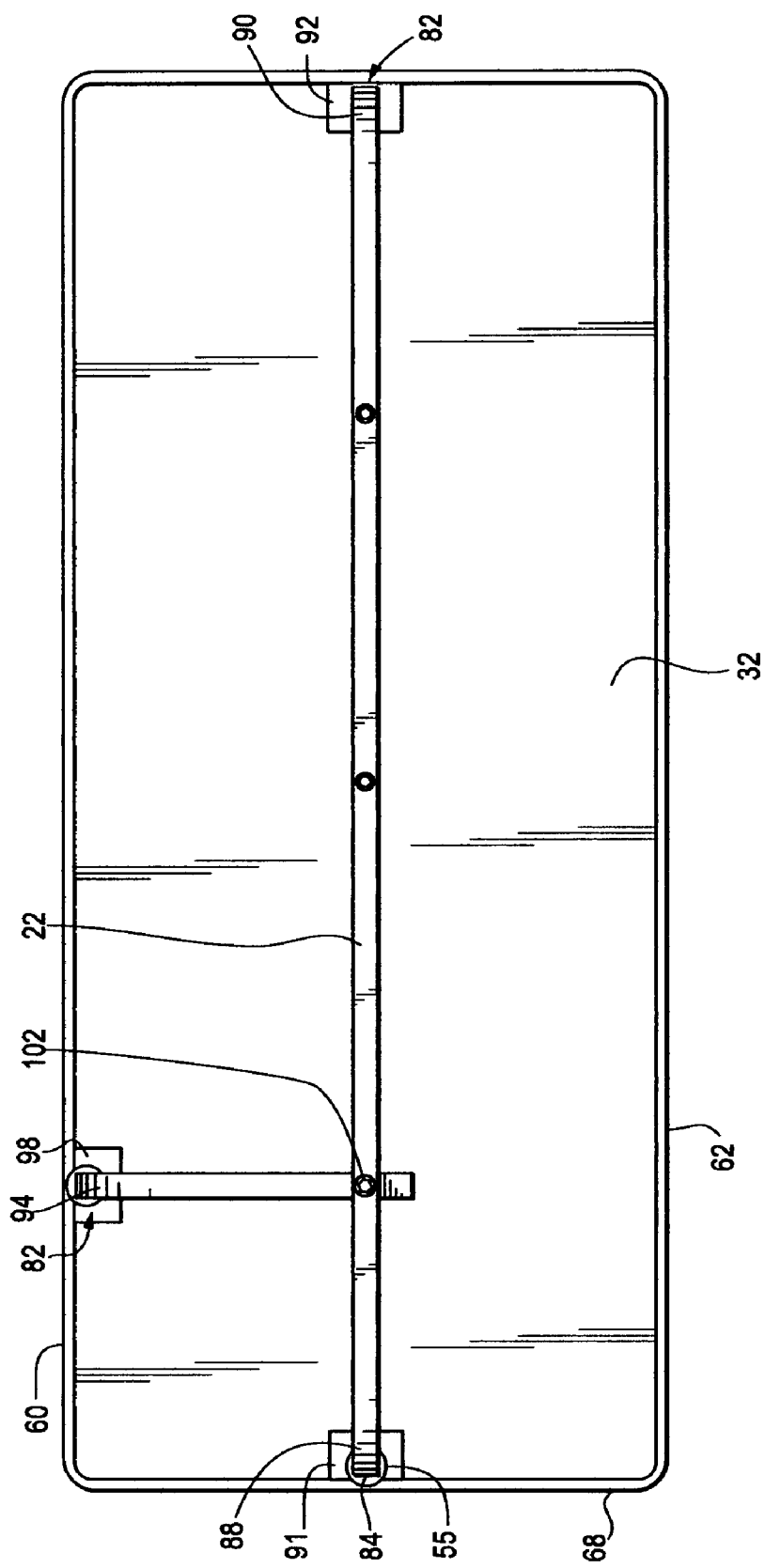

PET GROOMING RESTRAINT APPARATUS AND METHOD

BACKGROUND OF THE INVENTION

1. Field of the Invention

This invention generally relates a pet grooming restraint apparatus and method and more particularly to a grooming restraint apparatus that includes an overhead frame member to which the pet is secured by a leash.

2. Discussion of Prior Art

Various type of grooming stations are well know that generally employ a height adjustable table to which is attached some device or another for restraining the pet, such as a dog, to prevent it from leaving the table. In some grooming stations, leg restraints are employed while in others the pet is secured to the table by neck leashes and sometimes body leashes that pass beneath the body of the pet. In some units, the leashes are attached to a cantilever mounted L-shaped grooming arm assembly. The grooming arm has a crossing section to which the leash is attached that is supported in overlying relationship with respect to the table by means of a vertical section with one end releasably clamped to the edge of the table.

Other units employ two vertical sections clamped to opposite ends of the table that support an overhead grooming bar passing over the longitudinal center of the table between them to which the leashes are attached. This is a stronger restraint than the cantilever mounted L-shaped grooming arm assembly and is generally used with larger dogs.

It is critical that once the pet has been secured by a leash to the grooming arm or grooming bar it must not be allowed to leave the underlying support of the grooming table. In such event the animal may be choked by a neck leash, injured internally by a body leash or may cause other injuries by tipping over the table. A basic problem with all known grooming restraint system discovered by the inventors is that none of the grooming arms or grooming bars are constructed with sufficient structural integrity to ensure that the grooming arm assembly cannot be bent, twisted or otherwise distorted or partial or wholly disconnected from the table by the force of a large animal, such as a large dog. Without such distortion or disconnection the leash restraint may be adjusted to prevent the pet from moving off the table. In such case, a groomer, or groom, may feel confident that all is well and even leave the table, only to return to find the poor pet strangling or otherwise in distress or worse. Even when the groomer is present during an unexpected lunge by the pet, the pet may be too large for the groomer to prevent the pet from leaving the table despite the shortness of the leash because of the inadequate structural rigidity and insecure mounting of the grooming bar.

In general, these conditions have prevailed, because grooming efficiency requires good access to the pet from all directions. Even with the known systems in which the vertical support members are mounted to the ends of the table at the lateral center, the support members block or otherwise interfere with direct frontal and rearward access. Accordingly, some groomers prefer the even weaker cantilever mounted grooming arm even for larger dogs to minimize access blockage despite the increase danger to the pet. It has even been known employ rotating tables or rotating grooming arms to minimize the access blockage problem, but these solutions still do not address the problem of inadequate strength and weak mounting.

Thus, the inventors have recognized a need to provide a pet restraint apparatus that overcomes the problems of poor structural integrity, inadequate mounting while still providing good access especially from the rearward and frontal ends of the table.

SUMMARY OF THE INVENTION

Accordingly, it is the object of the present invention to provide a pet restraint apparatus and method of grooming employing same that overcomes the problems noted above with known pet restraint arms and pet restraint bars and associated method employing same.

This objective is achieved in part by providing a pet grooming restraint apparatus having a first, elongate, overhead frame member with a forward end, an opposite rearward end, one side and an opposite side, a first support assembly for supporting the overhead frame member above an underlying support table, a second support assembly for supporting the overhead frame member above the underlying support table, said second support assembly being longitudinally spaced from the first support assembly and including an elongate support member that extends laterally outwardly and downwardly from the overhead support member for attachment to the underlying support table on the one side of the overhead frame member, and means attached to at least one of the overhead frame, the first support assembly and the second support assembly for securing a pet against falling off the support table.

Preferably, the elongate support member has one of (a) an upper outwardly curved section connected to the frame member at one end and a substantially straight section extending from another end of the curved section to the underlying support table, (b) an upper section connected to the frame member at one end and extending outwardly and downwardly at a relatively gradual angle and a substantially straight section extending outwardly from another end of the upper section beneath the overhead frame member at an angle that is relatively steep compared to the gradual angle of the upper section, (c) an upper, substantially straight, section connected to the overhead frame member that is substantially horizontal and a lower, substantially straight vertical section that extends from the horizontal section to the underlying support table, and (d) an elongate, body that extends substantially straight entirely from the overhead frame member to the underlying support, and the first support assembly is substantially identical to the second support assembly. The first support assembly and the second support assembly are attached to the overhead frame member adjacent the forward end and the rearward end, respectively, to provide forward and rearward access openings between the one elongate support members and the other elongate support members. The second support assembly includes another elongate support member that extends laterally outwardly and downwardly from the overhead frame member, and away from the one elongate support member for attachment to the underlying support table on the opposite side of the overhead frame member. Each of the second support assemblies includes a generally horizontal foot member attached to and extending between distal ends of the one elongate support member and the other elongate support member. Means carried by the foot member for fastening the foot member to the underlying support table. The support assemblies are preferably attached to the overhead frame member at locations adjacent to the forward and rearward ends, respectively.

Preferably, the support members are not entirely straight but have an upper portion adjacent the overhead frame member that is curved outwardly from the overhead frame member to increase the spacing between the pair of second support members adjacent the overhead frame member.

Secure attachment of the second support assembly to the underlying support table is enhanced by including a generally horizontal foot member attached to the distal end of at least one of the second support members and extending inwardly laterally therefrom and carrying means for fastening the foot member to the underlying support table. Preferably, both of the second support members have a foot member attached to the distal end with means for attaching the foot member to the underlying support member, and the foot member for both is a single member that extends between and is attached at opposite ends to the distal ends of both of the second support members. This not only provides means for attachment to the table that does not protrude from the edge of the table, as do clamps, but creates a separate support structure for the overhead frame member that is independent of attachment to the table.

The object is also achieved by providing a pet grooming restraint apparatus including a first, elongate, overhead frame member with a forward end and an opposite rearward end, one side and an opposite side, a first forward support assembly including a first, elongate, forward, support member having an upper end attached to the forward end of the overhead frame member, a bottom end on the one side of the overhead frame member, and a first elongate body extending diagonally, laterally, outwardly and downwardly from the upper end to the bottom end, a second, elongate, forward, support member having an upper end attached to the forward end of the overhead frame member, a bottom end on the opposite side of the overhead frame member, and an elongate body extending diagonally, laterally, outwardly and downwardly from the upper end of the second forward support member to the bottom end of the second forward support member, and a rearward support assembly including a first, elongate, rearward, support member having an upper end attached to the rearward end of the overhead frame member, a bottom end on the one side of the overhead frame member, and an elongate body extending diagonally, laterally, outwardly and downwardly from the upper end of the first rearward support member to the bottom end of the first rearward support member, and a second, elongate, rearward support member having an upper end attached to the rearward end of the overhead frame member, a bottom end on the opposite side of the overhead member, and an elongate body extending diagonally, laterally, outwardly and downwardly from the upper end of the second rearward support member to a bottom end of the second rearward support member, and means for securely mounting the bottom ends of all the support members to an underlying, horizontal, support table. Preferably, an elongate foot member attached to both the first forward support member and the second forward support member of the forward support assembly, and another elongate foot member attached to both the first rearward support member and the second rearward support member.

The objective of the invention is also achieved by providing a pet grooming apparatus with an overhead frame member assembly including an overhead frame member with opposite ends, means at opposite ends of the overhead frame member for supporting the overhead frame member lengthwise above a central portion of an underlying support table, and a lateral support assembly with at an elongate lateral support member having one end attached to the overhead frame member and extending laterally therefrom to another end with a fastener for attachment to the underlying support table.

Preferably, the elongate lateral support member is generally L-shaped with a generally vertical section and a horizontal overhead section, the vertical section has a lower end attachable to the underlying table away from the central portion and an upper end and the overhead section having one end attached to the upper end of the vertical section and laterally extending therefrom to an opposite end attached to the overhead frame member.

The objective of the invention is also achieved in part by providing a method of grooming a pet by performing the steps of placing the pet on top of a grooming table fitted with a pet grooming restraint apparatus having an overhead frame member supported longitudinally above a central portion of the table by a first support assembly having a pair of support members with lower and upper ends respectively connected to the table and to one end portion of the frame member and having an access space between the pair of support members, and a second support assembly connected to another end portion of the table and another end of the overhead frame member; placing the pet on the table beneath the overhead frame member and between the first support assembly and the second support assembly; and securing the pet to the overhead frame member by means of a flexible leash-like restraint tied to the pet to prevent the pet from falling off the table during grooming, accessing the pet from the one end portion of the table through the access space between the pair of support members.

BRIEF DESCRIPTION OF THE DRAWINGS

The foregoing objects and advantageous features will be described in detail and further advantageous features and objects of the invention will be made apparent from the detailed description of the preferred embodiment and methods of the pet restraint apparatus of the present invention which is given with reference to the several figures of the drawing in which:

FIG. 8 is a plan view of the embodiment of FIG. 5.

DETAILED DESCRIPTION

Figure 1:
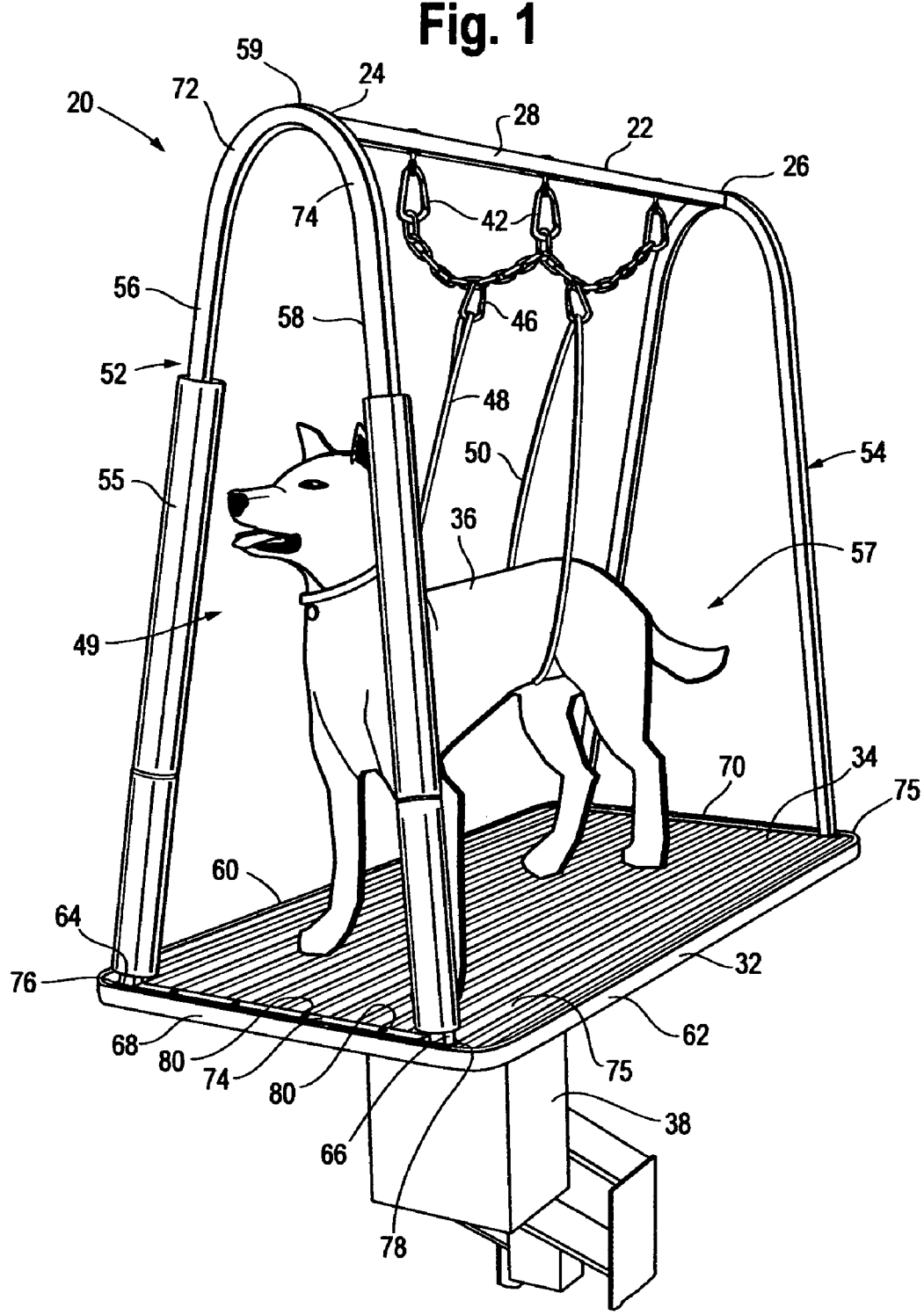
FIG. 1 is a perspective view of the preferred embodiment of pet grooming restraint apparatus as mounted to an adjustable grooming table.

Referring to FIGS. 1-4, a first embodiment 20 of the pet grooming apparatus of the present invention is seen to include a first, elongate, overhead frame member 22 with a forward end 24, an opposite, rearward end 26, a left side 28 and an opposite, right side 30 that is supported in parallel relationship directly over the elongate center axis of a rectangular grooming support table 32. The grooming table 32 may include a rubber-like cover 34 to enhance friction for non-sliding support of the pet 36 to be groomed. The table 32 is supported above a work floor upon an adjustable underlying support apparatus 38 that allows the operator to easily raise or lower the table 32. The overhead frame member 22 may have a plurality of substantially identical, vertically aligned, mounting holes 40 to attach a plurality of substantially identical chain mounting loops 42. A chain 44 is secured to the loops 42 and, in turn, carries other loops 46 that are adjustably, slidably mounted to the chain 44 to secure one or more neck leashes 48 and body restraints 50. The height of the overhead frame member 22 above the table 32 is approximately the same as the length of the table 32.

A first, forward, support assembly 52 supports the forward end 24 of the overhead frame member 22 above the underlying grooming support table, and a substantially identical second, rearward support assembly 54 supports the rear end 26 of the frame member 22 above the rear end of the grooming support table 32. The forward support assembly 52 and the rearward support assembly 54 are longitudinally spaced from each other by a distance that is slightly less than the length of the table 32 to insure good, secure mounting to the relatively strong parts of the table spaced at least some distance away from the relatively weaker edges.

The two support assemblies 52 and 54 are substantially identical. Each includes a pair of substantially identical, aligned, elongate, underlying support members 56 and 58. They may be wrapped with foam padding or the like to protect the pet against injury. The support members 56 and 58 extend outwardly away from each other from a common end 59 from the overhead frame member 22 and slant downwardly toward opposite sides 60 and 62, respectively, of the table 32. In the case of a table with approximate dimensions of 2.5-ft. by 4-ft., the spaced distal ends 64 and 66 are attached to the top of the table 32 at locations spaced inwardly from the sides 60 and 62 by approximately two to three inches and inwardly from the front edge 68 and rear edge 70 by approximately one inch. The inward spacing from the side edges 60 and 62 facilitates easy access to the pet from the sides 60 and 62 of the table 32. The ratio between the height of the overhead frame member 22 and the distance between the ends 64 and 66 of the support members 56 and 58

Except for top, curved shoulder portions 72 and 74 adjacent the common top end 59 of the support members 56 and 58 that is curved outwardly from overhead frame member 22, the elongate support members 56 and 58 are substantially straight. The outwardly curved shoulder portions 72 and 74 relatively increases the spacing between the pair of second support members 56 and 58, particularly near the top as opposed to the spacing that would result with the support members extending in straight lines for the entire distance between the overhead frame member 22 and the distal ends 64 and 66, as illustrated by the broken-line 67 illustration seen in FIG. 2. Entirely straight support members as shown by broken-line 67 would form a triangle with a sharp point 69 at the top where the support members meet the overhead member 22. The sharper this point and the closer together are the support legs, the greater the risk that the head or neck of a pet could become wedged or otherwise lodged. Moreover, the increased spacing provided by the curved top 59 is particularly advantageous when dealing with a large dog and access to the head and the chest portions, or the hind quarters, between the support members 56 and 58 is required.

However, in the case of pets that are substantially smaller than the space confined by the support members 56 and 58, the need for such increased spacing may less and the risk of a pet inadvertently becoming wedged between the support members adjacent the top is less. In such case, then the support members may be elongate, entirely straight members (not shown) that extend from the table 32 to the overhead frame member 22 in a straight line to form with the table 32 the shape of an equilateral triangle It is also contemplated that other shapes could employed to provide adequate if not optimum spacing between the support members 56 and 58, while still maintaining the structural rigidity obtained by having two slanted support members on the opposite sides 28 and 30 of the overhead frame member 22 at each of the opposite ends 24 and 26 of the overhead frame member 22. For instance the curved shoulder portion 59 could be replaced by a straight, elongate, horizontal shoulder illustrated by broken line 71 in FIG. 2. Alternatively, the horizontal shoulder is replaced by a pair of straight shoulder members illustrated by broken-line 73 in FIG. 2 that meet at an end of the overhead frame member 22 at their top and extend downwardly and outwardly like the top member of a clothes hanger. Other intermediate straight or curved shapes may work as well. What is important is that there are at least one and preferably two lateral support members on one or opposite sides of the overhead frame member 22, at one and preferably at both of the opposite ends 24 and 26 of the overhead frame member 22.

Figure 2:
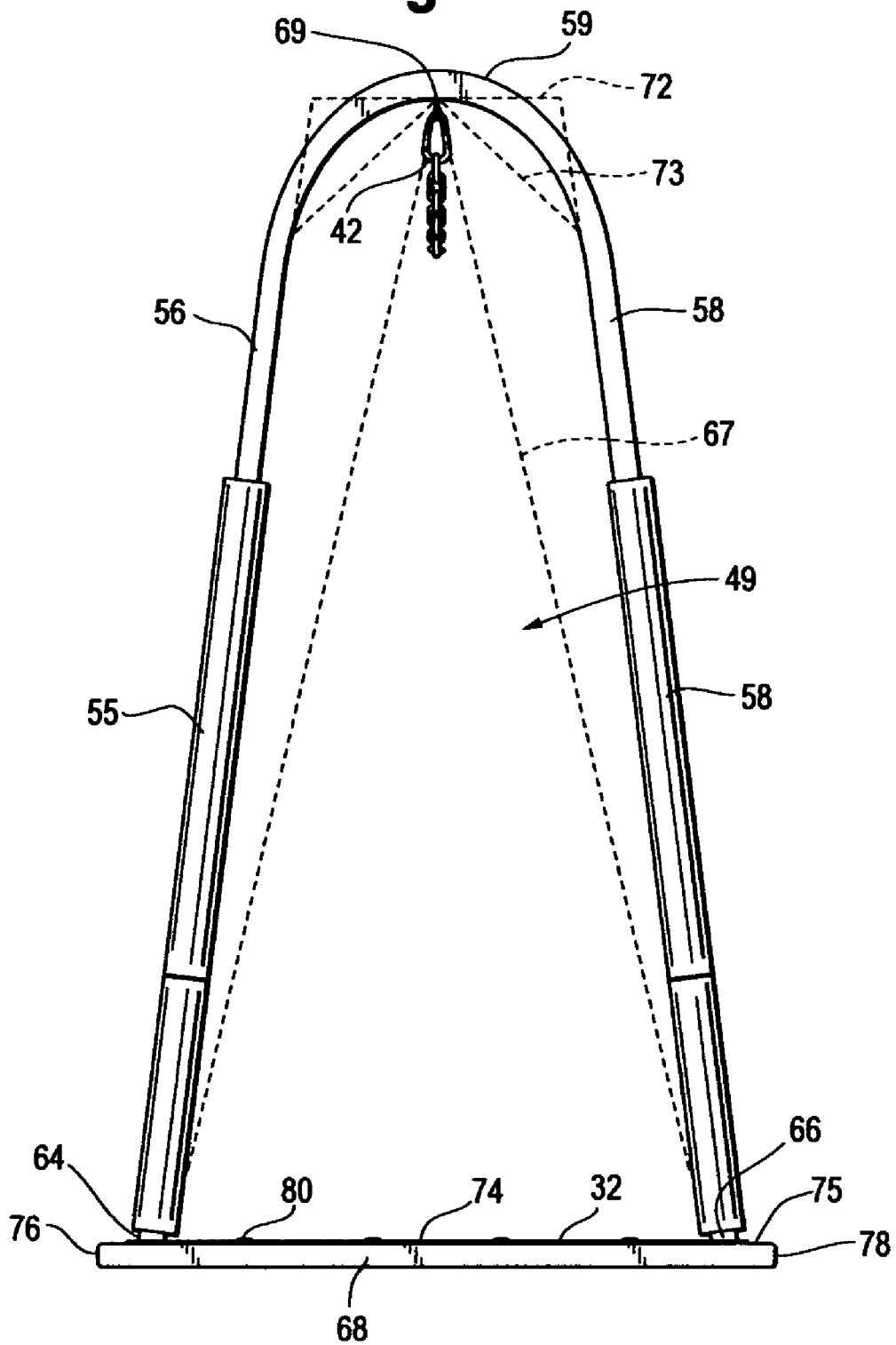
FIG. 2 is an end view of the embodiment of FIG. 1.

The support assembly 52 includes a generally horizontal, elongate, planer, foot, or base, member 74 that is attached at opposite ends 76 and 78 to the support member distal ends 64 and 66, respectively. Preferably, the ends 76 or 78 are welded, or integrally molded as a single piece with, the foot member 74. Alternatively, mating releasable fasteners are provided at the ends 76 and at the opposite ends of the foot member. The foot member 74 is supported by the top of the table 32 and extends in parallel relationship with the front edge 68. Preferably, the foot member 74 is attached to the table 32 by a plurality of substantially identical threaded fasteners 80 that pass through mating mounting holes in the table 32. Alternatively, the foot member 74 is releasably clamped to the edge 68 of the table 32 by suitable C-clamps or the like. In such case, the foot member may be channel shaped with a recess within which the edge 68 of the table 32 is sandwiched between and clamped. Preferably, the foot member 74 has a length equal to the separation between the ends 64 and 66 of the support members but is slightly less than the width of the table 32. This advantageously creates gap 75 between the edge of the table 32, such as edge 62, and the ends 64 and 66 of each of the support members While it is preferred to have a single foot member 74 to extend between and be attached to the opposite support member for enhanced structural integrity achieved with a triangular or triangular-like configuration that does not depend upon the strength of the table 32 at the edge 68. However, in the case where table strength is not a concern, the single foot member 74 may be replaced by two separate foot members (not shown) that extend from the support member ends inwardly toward each other by a distance less than the width of the table 32. Also, in the case of only a single one of the support members 56 and 58 being provided, the foot member 74 may still extend across substantially the entire table 32 directly beneath the support member to the same extent as when it interconnects two support members 56 and 58, as shown in FIGS. 1 and 2.

In a heavy duty construction of the pet grooming apparatus 20 the support members 56 and 58 and the curved shoulder 59 are integrally formed from a single piece of elongate steel, iron or other metallic solid or tubular stock that is bent into the configuration shown. The foot member is also made from a piece of solid steel stock with a rectangular cross section that welded at its opposite ends 76 and 78 to the distal ends 64 and 66 of the support members. The overhead frame member 22 is made from a single piece of steel or other metallic solid or tubular stock and is welded at its opposite ends 24 and 26 to the curved portions 59 of the support assembly 52.

Alternatively, for purposes of compact shipping, the overhead frame member is 22 is shipped unattached to the support assemblies. In such case, the support assemblies may carry oppositely inwardly facing frame member mounting cups 81 and 85, shown in broken-line in FIG. 3, within which the end portions 24 and 26 of the overhead frame member 22 are received and releasably fastened. Fastening may be by threaded fasteners passing through aligned fastening holes in the ends of the overhead frame and the mounting cups, by threaded coupler, as on a conventional garden hose connector, or by any other suitable mechanical means.

Figure 3:
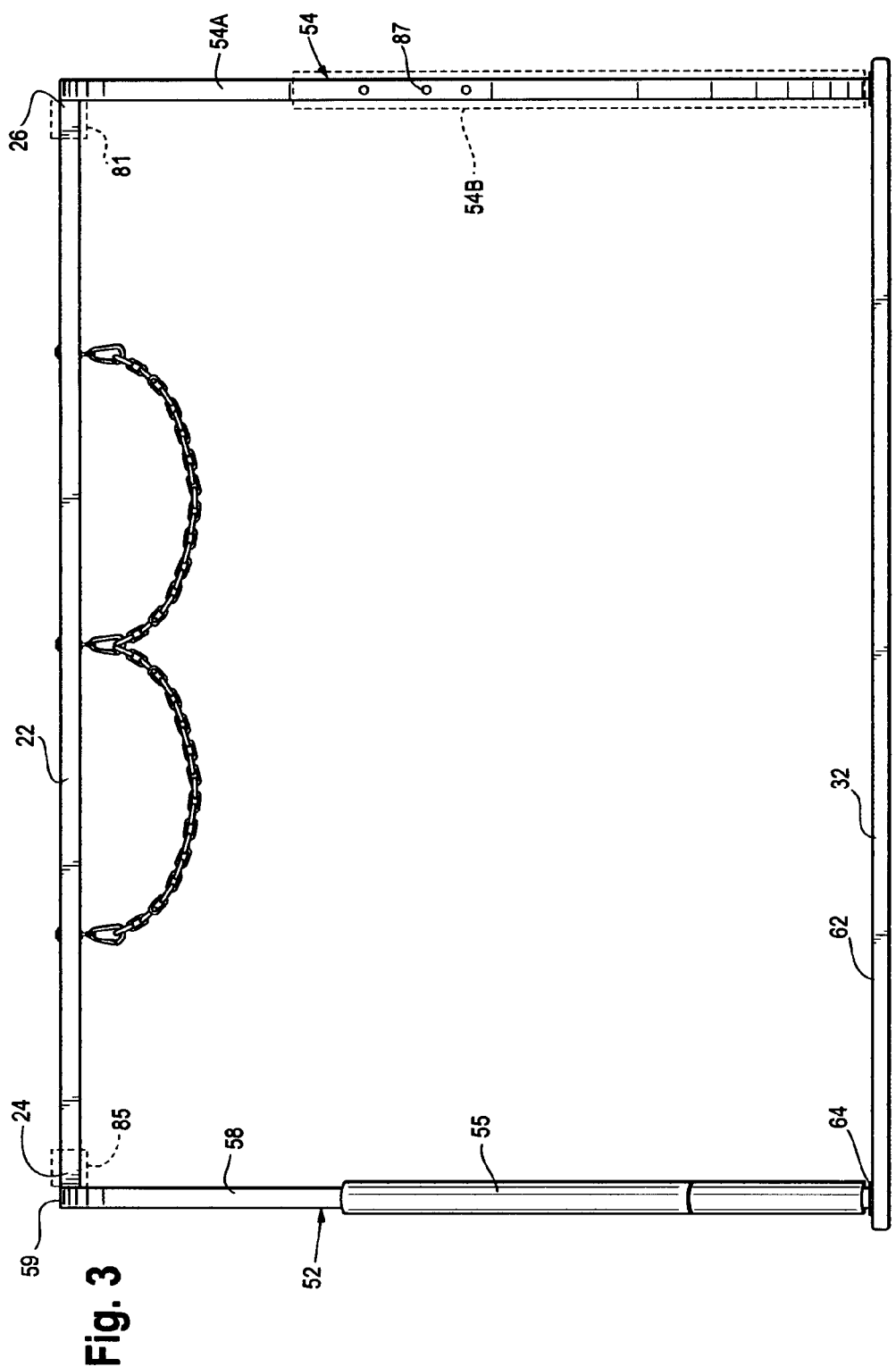
FIG. 3 is a side view of the embodiment of FIG. 1.
Figure 4:
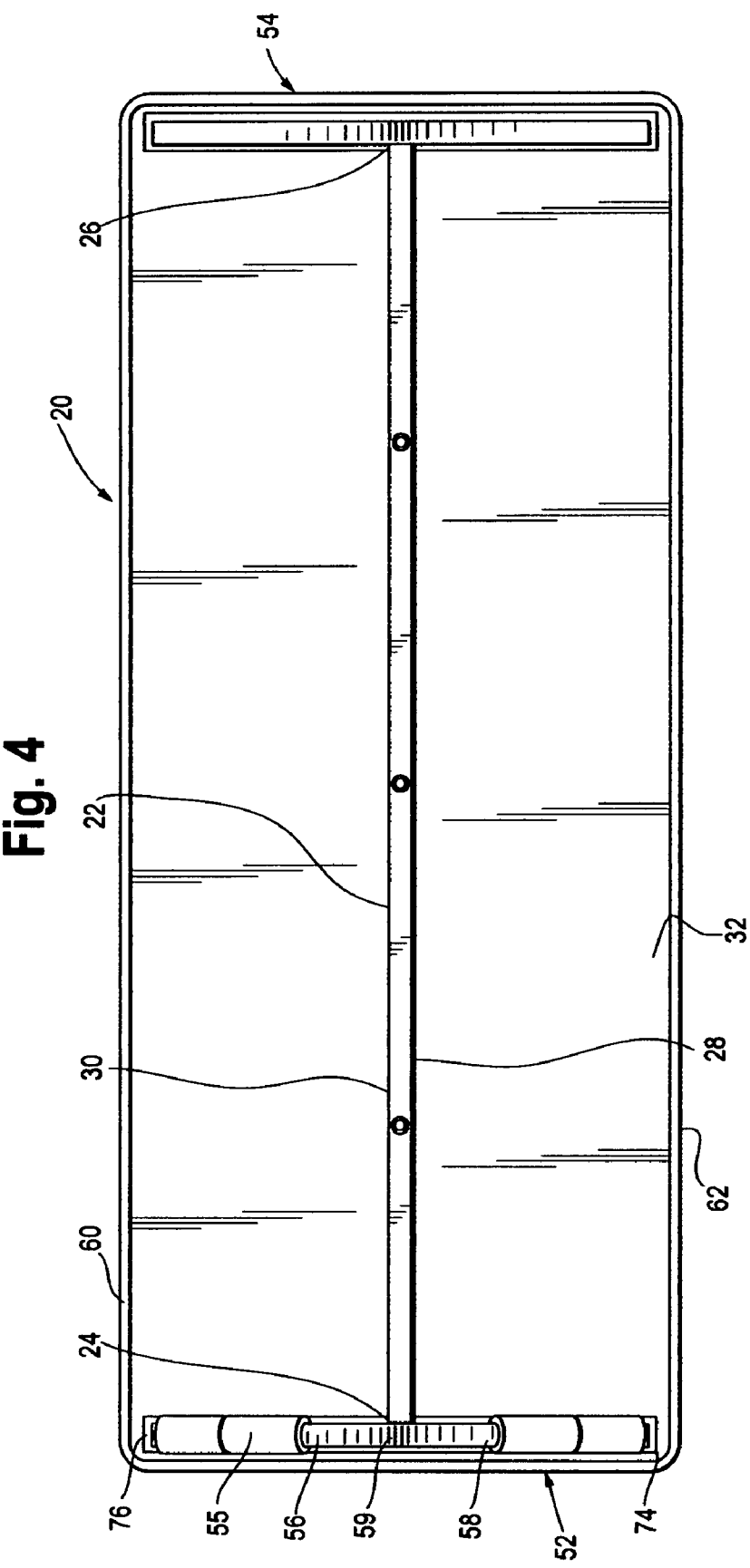
FIG. 4 is a plan view of the embodiment of FIG. 1.

For purposes of adjustability, each of the support members 56 and 58 and the overhead frame member 22 may be assembled from two pieces of tubular stock instead of a single piece, such as pieces 54A and 54B, shown in FIG. 3 in broken line. In such case, the two pieces 54A and 54B are formed of tubular stock of different diameters so that one may telescopically, slideably fit within the other and are thus interconnected for relative movement for purposes of adjusting the effective length of the member in question. Each of the two pieces 54A and 54B carry a plurality of holes 87 along their individual lengths associated with different effective lengths of the composite member. Once the two pieces are adjusted to the desired length, a fastener is passed through the aligned holes 87 and secured. In this way, each of the height, the separation between the support assemblies and the separation between the ends 64 and 68 may be independently adjusted to suit the size of the pets being groomed and the size of the grooming table.

Referring now to FIGS. 5-8, another pet restraint apparatus 82 constructed in accordance with the present invention is shown. Some of the features that have a function that is the same or similar to corresponding feature of the embodiment 20 are given the same reference numeral and are not described again in detail. Unlike the pet restraint apparatus 20, this embodiment of the invention has only a single lateral support assembly 89. The lateral support assembly 82 is attached to the table at a location laterally spaced from the overhead frame member 22 and longitudinally spaced from both of the ends 24 and 26 of the overhead frame member 22, and is attached to the overhead frame member 22 at a location spaced from both of the opposite ends 24 and 26.

The support assemblies 52 and 54 are replaced with a pair of legs 84 and 86 that are aligned with each other and with the overhead frame member 22 to support the overhead frame member lengthwise above a central portion of the underlying support table 32. Because the pair of legs 84 and 86 are vertically aligned beneath the frame member and generally lie in the same plane as the frame member 22, preferably, they are integrally formed together with the overhead frame member 22 from a single piece of elongate metallic stock. This piece of stock is bent downwardly at right angles at the curved corners 88 and 90 to form the vertical legs 84 and 86 at the opposite ends of the 24 and 26 of the overhead frame member 22. Alternatively, the legs and overhead frame member are made from individual pieces that are welded together in which case the curves at the corners 88 and 90 may be eliminated so that the pieces meet at a right angle. The distal ends 90 and 92 of the legs are either permanently fastened to the table by means of foot member 91 and 93 welded to the bottoms of the legs 84 and 86 and substantially like foot member 74 except being shorter in length and extending on opposite sides of the legs 84 and 86. Preferably, the foot members 91 and 93 are attached to the table 32 with threaded fasteners in the same way the foot member 74 is attached, as described above. Alternatively, the foot members 91 and 93 are releasably attached to the table by means of a C-clamp or other like releasable fastener.

Preferably, the lateral support assembly 89 is L-shaped with an elongate substantially horizontal, lateral support overhead section, or member, 94 integrally formed with and joined at a right angle to a substantially vertical support section, or member, 96. The vertical section is substantially perpendicular to the overhead frame member 22 and the planer surface of the table 32. The overhead section 94 is substantially parallel to, and level with, the overhead frame member 22 and is substantially parallel to the planer surface of the table 32. The lateral support overhead section 94 has one end attached to the overhead frame member 22 and extends laterally therefrom to the vertical support section 96 at a location laterally spaced from the elongate center of the table 32. The distal end of the vertical support member 96 is welded to a mounting foot 98 which, in turn, is fastened to the table 32 adjacent side 60 either with threaded fasteners or with clamps. Advantageously, the lateral support, overhead section 94 passes beneath the overhead frame member 22, to provide underlying support to the overhead frame member 22. A threaded eyelet fastener 100 passes upwardly through a mounting hole though the overhead frame member 22 and is secured within the mounting hole by a mating bolt 102. The underlying eyelet 100 may be used to fasten eyelet 42 and the associated chain 43.

Alternatively, the L-shaped configuration of the lateral support assembly 82 assists in providing good head clearance with the lateral overhead section 94 at approximately the same height as the overhead frame 22 for most of its length. Alternatively, the support assembly 89 may be formed the same as one of the legs 56 and 58 of FIG. 1 attached to half of the curved shoulder 59 and attached to the overhead frame member 22 in the same fashion as shown in FIG. 1 but with the shoulder attached to the frame member at a location spaced from either of the ends 24 and 26. Alternatively, the lateral support assembly may be a single straight member that extends straight from the side of the table 32 to the overhead frame member 22.

One of the big advantages of the both of the pet restraint apparatus of FIGS. 1-4 is that it provides not only the stability that is needed to insure secure pet restraint for even large dogs and the like, but also enables good front access to the pet 36 through the space 49 between the front support legs 56 and 58 of the front support assembly 52. Advantageously, the back support assembly 54 also provides good rear access to the pet 36 though the space 57 between the support legs of the back support assembly 54. Accordingly, by employing the pet restraint apparatus 20 of the present invention a new method of grooming a pet is provided by performing the steps of (1) placing the pet on top of a grooming table fitted with a pet grooming restraint apparatus having an overhead frame member supported longitudinally above a central portion of the table by (a) a first support assembly having a pair of support members with lower and upper ends respectively connected to the table and to one end portion of the frame member and having an access space between the pair of support members, and (b) a second support assembly connected to another end portion of the table and another end of the overhead frame member, (2) placing the pet on the table beneath the overhead frame member and between the first support assembly and the second support assembly, and (3) securing the pet to the overhead frame member by means of a flexible leash-like restraint tied to the pet to prevent the pet from falling off the table during grooming, and (4) accessing the pet from the one end portion of the table through the access space between the pair of support members. Preferably the pet grooming apparatus 20 has another lateral support assembly at the other end, and the method includes accessing the pet from the other end portion of the table 32 through the other access space.

Figure 5:
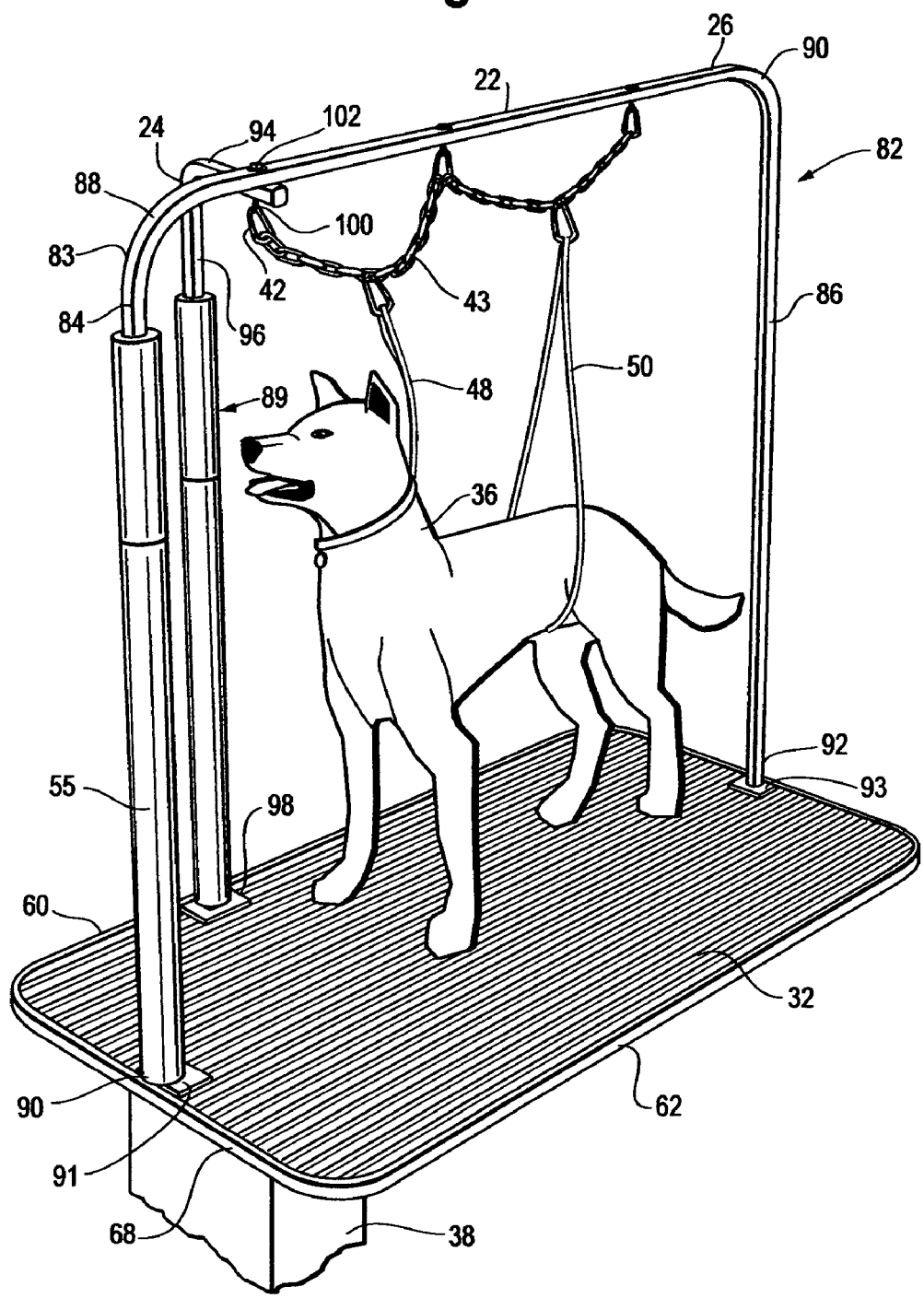
FIG. 5 is a perspective view of another embodiment of the pet grooming restraint assembly that is lighter weight than the embodiments of FIGS. 1-4 and in which lateral support is provided by an L-shaped support member laterally spaced from one of two vertical support members that support the overhead restraint member.
Figure 6:
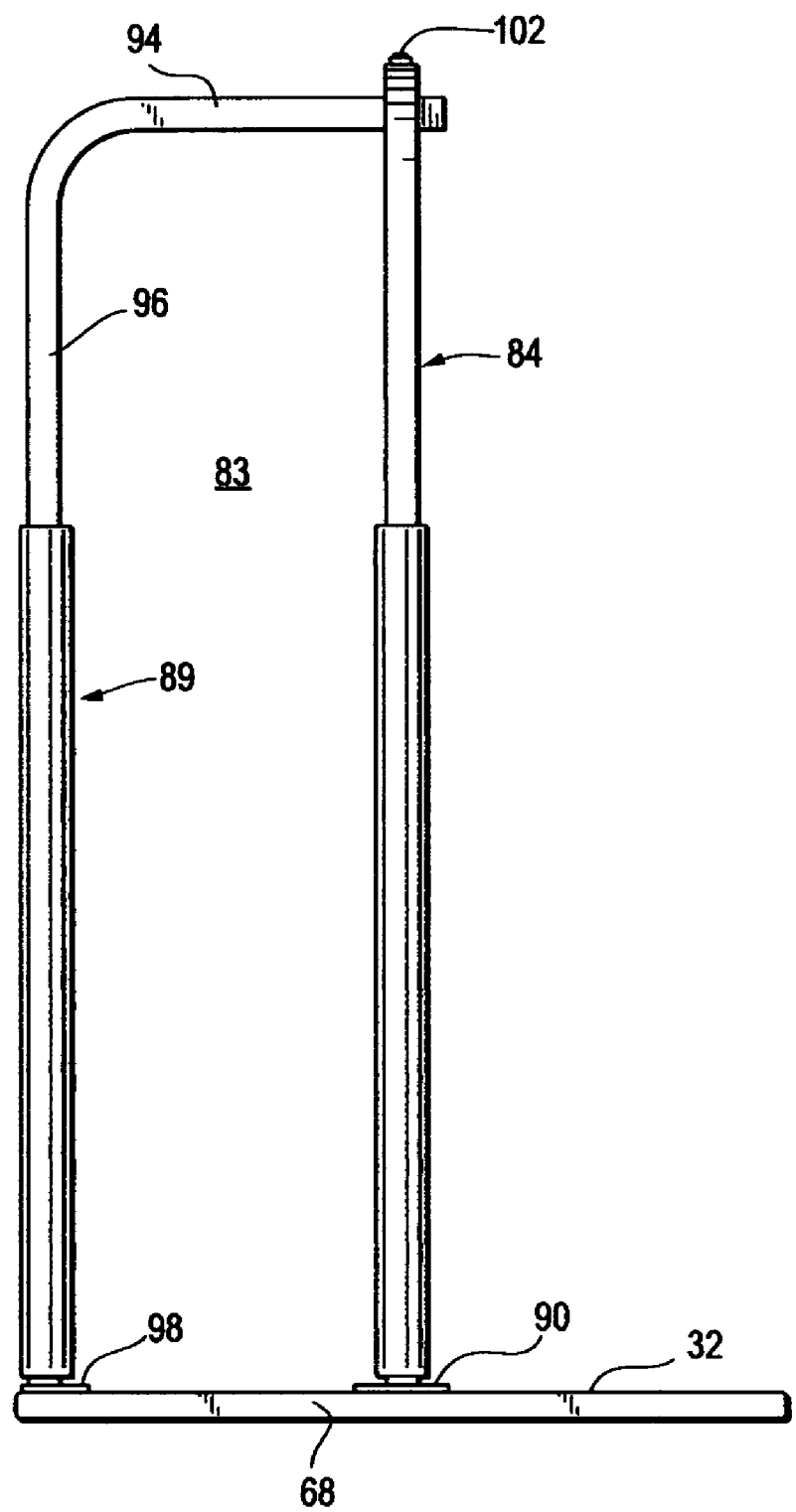
FIG. 6 is a front end view of the embodiment of FIG. 5.
Figure 7:
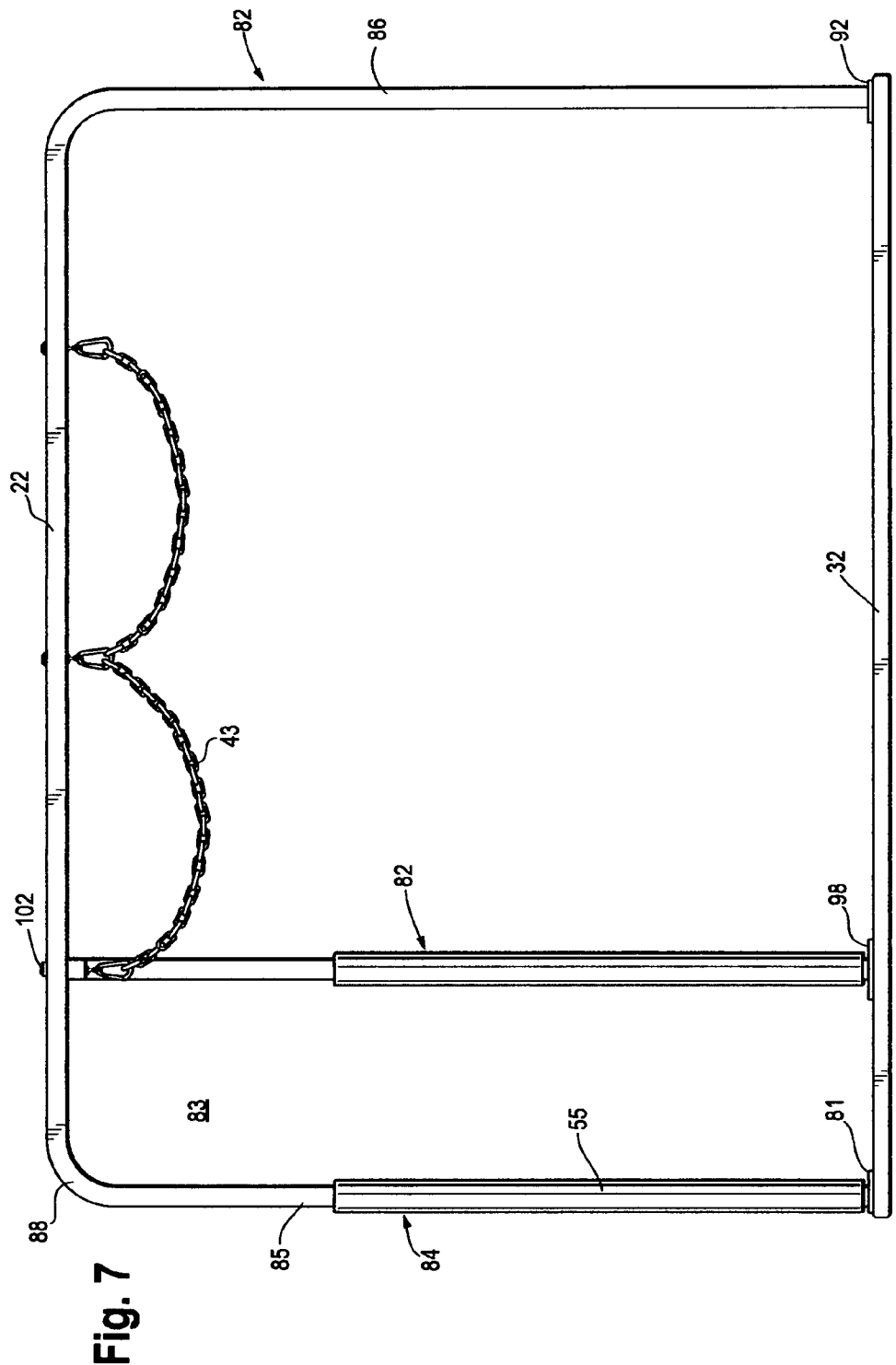
FIG. 7 is a side view of the embodiment of FIG. 5.

While the embodiment 82 of the pet restraint apparatus of the present invention disclosed in FIG. 5 does not have lateral support members at the opposite ends, the lateral support assembly 89 advantageously provides the needed lateral support to provide good structural integrity while still providing a space 83 between the front centered support member 84 and the lateral support leg 96 that is located spaced from the front end 68 of the table for both diagonal and lateral access to the front of the pet 36. Likewise, another space 85 is provided between the lateral support assembly 82 and the rear support member 86 for both diagonal and lateral access to one side and the rear of the pet 36. With only one lateral support assembly 89 on only one side of the table 32, full access is available on the side 62 of the table opposite the lateral support assembly 82 between the front support member 84 and the rear support member 86.

According, with one method of the invention, access to the pet is obtained to the pet diagonally through the access opening 83.

While particular embodiments have been disclosed in detail, it should be appreciated that many variation may be made without departing from the scope of the invention as defined in the appended claims, as generally noted above. It should be appreciated that the different support assemblies may be mixed in various combinations while still obtaining the benefits of the invention. Also, while the support assembly of the first embodiment 20 has a pair of spaced apart legs, it should be appreciated that one of the legs may be removed so long as the remaining leg is provided with good underlying support by the foot member. If both support apparatus at opposite ends of the overhead frame member are each provided with only one lateral support leg, the two legs on opposite ends of the table may also be on opposite sides or the same sides of the table. The L-shaped support of the embodiment 82 may be combined with one or both the lateral support assemblies of embodiment 20. While these variations may not be preferred, it is believed that they all facilitate the achievement of the objectives of the invention. Other variations like these will occur to those skilled in the art. Moreover, while the fabrication is preferably from durable metals that are welded together except where adjustment is provided, it is believed that the entire pet restraint apparatus may be made from a single integrated mold of metal or durable plastic or other like material to eliminate assembly.

The invention claimed is:

1. A pet grooming restraint apparatus, comprising:
a first, elongate, overhead frame member with a forward end, an opposite rearward end, one side and an opposite side; and
a pair of support assemblies respectively rigidly attached to the forward end and the rearward end for supporting the overhead member above a pet support surface, at least one of the support assemblies having an elongate foot member extending in a direction transverse to the elongate overhead frame member and a pair of outwardly, laterally extending, elongate, support members, each of the support members having one end rigidly attached to the overhead frame member and another opposite end rigidly attached to the foot member to form a generally three sided, self-supporting, rigid, support frame, said rigid support frame rigidly supporting the overhead member above the pet support surface independently of any attachment to the pet support surface each foot member carries means for rigidly attaching the foot member onto the upwardly facing top surface of the pet support surface; and
means attached to at least one of the overhead frame member, and the pair of support assemblies for securing a pet against separation from beneath the overhead member.

2. The pet grooming restraint apparatus of claim 1 in which the elongate support member has one of
(a) an upper, substantially straight section extending outwardly and downwardly at a relatively gradual angle from one end of the upper section connected to the frame member and a substantially straight section extending outwardly and downwardly from another end of the upper section beneath the overhead frame member at an angle that is relatively steep compared to the gradual angle of the upper section,
(b) an upper, substantially straight, section connected to the overhead frame member that is substantially horizontal and a lower, substantially straight vertical section that extends from the horizontal section to the underlying support table,
(c) an elongate, body that extends substantially straight entirely from the overhead frame member to the underlying support, and
(d) a body shaped in the form of half of an elongate, entirely arcuate, arched body with one end attached to the overhead support member and an opposite end attached to the underlying support table.

3. The pet grooming restraint apparatus of claim 1 in which each of the elongate support members has a variable effective length made from two slidably interconnected parts, and including
means for attaching the interconnected parts together in different preselected relationships associated with different effective lengths of the straight section.

4. The pet grooming restraint apparatus of claim 1 in which the overhead frame member is fixedly attached to both of the pair of support assemblies.

5. The pet grooming restraint apparatus of claim 1 in which the overhead frame member has a variable effective length made from two slidably interconnected frame member sections, and including
means for attaching the two interconnected sections together in different preselected relationships associated with different effective lengths of the overhead frame member.

6. The pet grooming restraint apparatus of claim 1 in which each of the pair of support members is formed from a single piece of elongate stock with a centrally located curved arch with a top, and
the overhead frame member is made from another piece of elongate stock and includes means for releasably attaching the forward end and the rearward end of the overhead frame member to the single pieces of elongate stock adjacent the top of the arch.

7. The pet grooming restraint apparatus of claim 1 in which the support assembly other than the at least one support assembly has an elongate support member that extends vertically straight downwardly from one end attached to the overhead frame member to an opposite end attached to the underlying support table.

8. The pet grooming restraint apparatus of claim 7 including another elongate support member attached to, extending laterally outwardly and downwardly from, the overhead support member, intermediate the opposite ends of the elongate support member, for attachment to the underlying support table on only one side of the overhead frame member.

9. A pet grooming restraint assembly, comprising:

a height adjustable table assembly including a height adjustable, substantially flat, rectangular, horizontal, support table, with an upwardly facing top surface extending between open, unobstructed opposite sides and open, unobstructed open ends, and a height adjustment mechanism located only beneath the table and spaced from the opposite unobstructed open ends to leave the open ends unobstructed; and a pet restraint including an elongate, generally horizontal, overhead member with a pair of opposite ends, a pair of support assemblies supporting the opposite ends of the overhead frame member above the support table with the overhead frame member extending over a central portion of the support table, each of the pair of support assemblies having an elongate, horizontal, rigid, table reinforcing, foot member overlying the upwardly facing top surface of the table adjacent a respective one of the opposite ends of the table a pair of elongate support members respectively, rigidly, attached to a respective one of the pair of opposite ends of the overhead frame member and extending laterally, outwardly and downwardly from the overhead support member for fixed attachment to the opposite ends of the table reinforcing foot member, said attachment of the reinforcing foot member preventing movement relative to the support members and the overhead member to provide structural integrity to the pet restraint independently of any attachment to the table, and means for rigidly attaching the elongate, table reinforcing foot member to the upwardly facing top surface of the table to preclude any movement of the reinforcing foot member relative to the table and the overhead member, said rigid attachment of the foot member to the top surface of the table reinforcing the structural integrity of the table.

10. The pet grooming restraint assembly of claim 9 in which each of the foot members is substantially planer and lies flat upon the upwardly facing top surface of the table adjacent to and parallel to a respective one of the pair of opposite ends of the table surface.

11. The pet grooming restraint assembly of claim 9 in which the foot members are fixedly attached to the overhead frame member through the attached support assemblies independently of attachment to the table and are immovable relative to the overhead frame member and the support members even when detached from the table.

12. The pet grooming restraint assembly of claim 9 in which the opposite ends of the foot members are fixedly welded to the support members to which the foot members are attached.

13. The pet grooming restraint assembly of claim 9 in which the foot members are attached to the upwardly facing surface of the table by a plurality of mounting fasteners that pass through mating mounting holes in the table adjacent the opposite ends of the table surface.

14. The pet grooming restraint assembly of claim 9 in which the table surface has a width, and each foot member has a length that is significantly less than the width of the table surface to provide gaps between the opposite sides of the table and each of the support members to which each foot member is attached.

15. The pet grooming restraint assembly of claim 9 in which the table surface has a length between the opposite ends of the table, and the overhead member has a length that is less than the length of the table to provide gaps between the opposite ends of the table and the table reinforcing foot members.

* * * * *